(12) United States Patent
Choi

(10) Patent No.: US 10,514,784 B2
(45) Date of Patent: Dec. 24, 2019

(54) INPUT DEVICE FOR ELECTRONIC DEVICE AND VEHICLE INCLUDING THE SAME

(71) Applicants: HYUNDAI MOTOR COMPANY, Seoul (KR); KIA MOTORS CORPORATION, Seoul (KR)

(72) Inventor: Young Rok Choi, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 80 days.

(21) Appl. No.: 15/635,647

(22) Filed: Jun. 28, 2017

(65) Prior Publication Data

US 2018/0170182 A1    Jun. 21, 2018

(30) Foreign Application Priority Data

Dec. 19, 2016  (KR) .......................... 10-2016-0173724

(51) Int. Cl.
*G06F 3/0362* (2013.01)
*B60K 37/06* (2006.01)
(Continued)

(52) U.S. Cl.
CPC ............ *G06F 3/0362* (2013.01); *B60K 37/06* (2013.01); *G06F 3/03547* (2013.01); *G06F 3/0488* (2013.01); *B60K 2370/126* (2019.05); *B60K 2370/143* (2019.05); *B60K 2370/146* (2019.05); *B60K 2370/1468* (2019.05); *B60K 2370/158* (2019.05)

(58) Field of Classification Search
CPC ............... G06F 3/04883; G06F 3/0482; G06F 3/04845; G06F 3/017; G06F 3/0362; G06F 3/038; G06F 9/451; G06F 3/04847; G06F 3/0488; G06F 3/03547; B60K 2350/1016; B60K 2350/102; B60K 37/06; B60K 2370/126; B60K 2370/146; B60K 2370/158; B60K 2370/143; B60K 2370/1468; B60K 35/00
See application file for complete search history.

(56) References Cited

U.S. PATENT DOCUMENTS 6,441,753 B1 * 8/2002 Montgomery .......... H04M 1/23
                                                             200/5 A
8,159,476 B2    4/2012 Kim
(Continued)

FOREIGN PATENT DOCUMENTS

KR     10-2016-0085189 A    7/2016
WO           03/046822 A1    6/2003

*Primary Examiner* — Dismery Mercedes
(74) *Attorney, Agent, or Firm* — Morgan, Lewis & Bockius LLP

(57) ABSTRACT

An input device for an electronic device includes a gesture input device enabling a user to input a gesture by touching, and physically rotating, a rotation sensor sensing the physical rotation of the gesture input device, and a controller controlling the gesture input device. The gesture input device has a concave, downwardly inclined shape, and includes a curved section in a center portion of the gesture input device, and an inclined section around the curved section, and the inclined section includes a touch sensor configured to sense a user's touch input, and at least one rib raised or lowered according to a control signal from the controller.

16 Claims, 12 Drawing Sheets

(51) Int. Cl.
*G06F 3/0488* (2013.01)
*G06F 3/0354* (2013.01)

(56) References Cited

U.S. PATENT DOCUMENTS

| | | | | |
|---|---|---|---|---|
| 8,982,062 | B2* | 3/2015 | Bos | G06F 3/03547 |
| | | | | 345/173 |
| 9,454,256 | B2* | 9/2016 | Fisher | G06F 1/1626 |
| 9,811,200 | B2* | 11/2017 | Lee | G06F 3/0416 |
| 10,126,938 | B2* | 11/2018 | Min | G06F 3/0338 |
| 2006/0279554 | A1* | 12/2006 | Shin | G06F 3/03547 |
| | | | | 345/173 |
| 2007/0057922 | A1* | 3/2007 | Schultz | G06F 3/03547 |
| | | | | 345/173 |
| 2008/0202824 | A1* | 8/2008 | Philipp | G06F 3/02 |
| | | | | 178/18.01 |
| 2009/0289923 | A1* | 11/2009 | Inoue | G06F 3/0362 |
| | | | | 345/184 |
| 2010/0060568 | A1* | 3/2010 | Fisher | G06F 3/03547 |
| | | | | 345/156 |
| 2011/0219901 | A1* | 9/2011 | Giefer | B60K 37/06 |
| | | | | 74/473.3 |
| 2013/0100016 | A1 | 4/2013 | Onodera | |
| 2015/0041299 | A1* | 2/2015 | Suzuki | H01H 3/0213 |
| | | | | 200/5 A |
| 2015/0071465 | A1* | 3/2015 | Zalisk | G06F 3/0312 |
| | | | | 381/105 |
| 2015/0121274 | A1* | 4/2015 | Kishimoto | B60K 37/06 |
| | | | | 715/771 |
| 2015/0185769 | A1* | 7/2015 | Takata | G06F 3/0338 |
| | | | | 345/173 |
| 2016/0137064 | A1* | 5/2016 | Min | B60K 37/06 |
| | | | | 345/156 |
| 2016/0179366 | A1 | 6/2016 | Min et al. | |
| 2017/0131792 | A1* | 5/2017 | Hayashi | G05G 9/047 |
| 2017/0255280 | A1* | 9/2017 | Pacsai | G06F 3/0362 |

\* cited by examiner

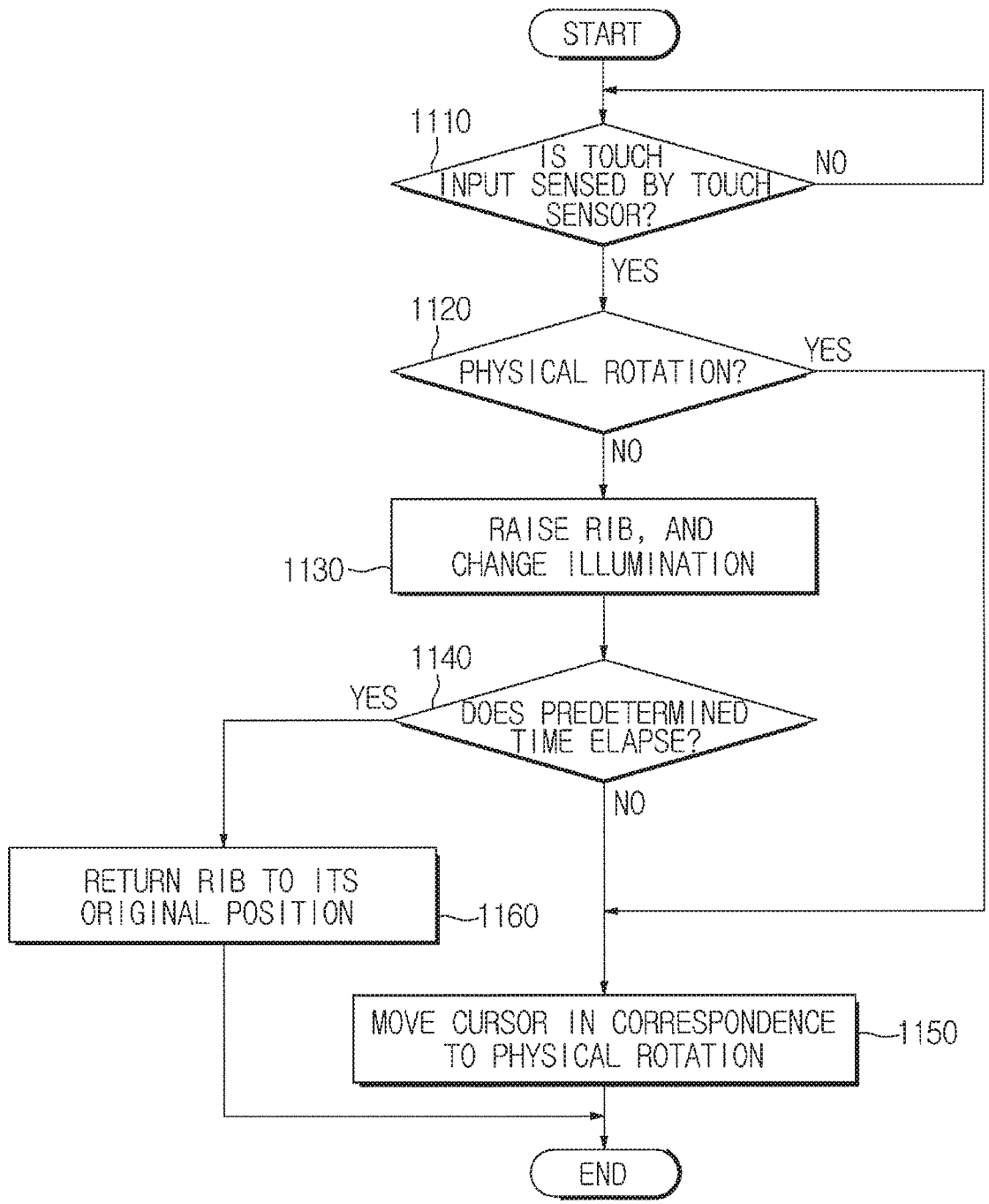

INPUT DEVICE FOR ELECTRONIC DEVICE AND VEHICLE INCLUDING THE SAME

CROSS-REFERENCE TO RELATED APPLICATION

This application claims the benefit of priority to Korean Patent Application No. 10-2016-0173724, filed on Dec. 19, 2016 in the Korean Intellectual Property Office, the disclosure of which is incorporated herein by reference.

TECHNICAL FIELD

The present disclosure relates to an input device capable of physically rotating, and a vehicle including the same.

BACKGROUND

With the development of electronic communication technologies, various electronic devices have been developed, and an importance on the aesthetics of the electronic devices as well as user convenience has been increasing. With this trend, input devices including a keyboard or a keypad have been diversified.

An input device is to configure an interface between a user and an information and communication device having various displays. The input device enables an interface between an information and communication device and a user when the user touches or approaches a touch pad or a touch screen using a pointing tool, such as his/her finger or a touch pen.

Since the input device can be easily used by men and women of all ages though a contact using a pointing tool such as a finger or a touch pen, the input device is used in various devices, such as automated teller machine (ATM), personal digital assistant (PDA), a mobile phone, etc., and widely used in various fields, such as banks, public offices, sightseeing and traffic guidance, etc.

Recently, efforts for applying the input device to health- or medical-related products and vehicles are continuing. The utilization of the input device is increasing since it can be implemented in a touch screen or used separately from a display.

SUMMARY

An aspect of the present disclosure provides an input device of preventing wrong operation of physical rotation due to slipping of a finger, and a vehicle including the input device.

Additional aspects of the disclosure will be set forth in part in the description which follows and, in part, will be obvious from the description, or may be learned by practice of the disclosure.

In accordance with an exemplary embodiment of the present disclosure, an input device includes a gesture input device, a rotation sensor, and a controller. The gesture input device is configured to enable a user to input a gesture by touching, and to physically rotate. The rotation sensor configured to sense the physical rotation of the gesture input device. The controller configured to control the gesture input device. The gesture input device has a concave, downwardly inclined shape, and comprises a curved section in a center portion of the gesture input device, and an inclined section around the curved section, and the inclined section comprises a touch sensor configured to sense a user's touch input, and at least one rib configured to be raised or lowered according to a control signal from the controller.

If the user's swype gesture is sensed by the touch sensor, and no rotation of the gesture input device is sensed by the rotation sensor, the controller may raise the at least one rib.

If no touch input is sensed by the touch sensor for a predetermined time period, the controller lowers the at least one rib.

If rotation of the gesture input device is sensed by the rotation sensor, the controller calculates a rotation value corresponding to the rotation.

The input device may further comprise a light emitter disposed outside the inclined section, and be configured to emit light according to a control signal from the controller. If the user's swype gesture is sensed by the touch sensor, and no rotation of the gesture input device is sensed by the rotation sensor, the controller may control the light emitter to emit light.

The input device may further comprise a light emitter disposed outside the inclined section, and be configured to change illumination according to a control signal from the controller. If the user's swype gesture is sensed by the touch sensor, and no rotation of the gesture input device is sensed by the rotation sensor, the controller may change illumination of the light emitter.

The inclined section may comprise a plurality of gradations that are embossed or engraved.

The inclined section may be integrated into the curved section, and be physically rotatable simultaneously with the curved section.

The gesture input device may be configured to be pressed.

The center portion of the gesture input device may be configured to be pressed, to be tilted in four directions of a up direction, a down direction, a left direction, and a right direction or in more directions, and to receive different signals according to pressing operation and tilting operation.

In accordance with another exemplary embodiment of the present disclosure, a vehicle includes a gesture input device, a rotation sensor, and a controller. The gesture input device is configured to enable a user to input a gesture by touching, and to rotate physically. The rotation sensor is configured to sense the physical rotation of the gesture input device. The controller is configured to control the gesture input device. The gesture input device has a concave, downwardly inclined shape, and comprises a curved section in a center portion of the gesture input device, and an inclined section around the curved section, and the inclined section comprises a touch sensor configured to sense a user's touch input, and at least one rib configured to be raised or lowered according to a control signal from the controller.

If the user's swype gesture is sensed by the touch sensor, and no rotation of the gesture input device is sensed by the rotation sensor, the controller may raise the at least one rib.

If no touch input is sensed by the touch sensor for a predetermined time period, the controller may lower the at least one rib.

The vehicle may further comprise a display configured to display content on a screen. If rotation of the gesture input device is sensed by the rotation sensor, the controller may calculate a rotation value corresponding to the rotation, and move a cursor displayed on the screen according to the calculated rotation value.

The vehicle may further comprise a light emitter disposed outside the inclined section, and configured to emit light according to a control signal from the controller.

If the user's swype gesture is sensed by the touch sensor, and no rotation of the gesture input device is sensed by the rotation sensor, the controller may control the light emitter to emit light.

The vehicle may further comprise a light emitter disposed outside the inclined section, and configured to change illumination according to a control signal from the controller. If the user's swype gesture is sensed by the touch sensor, and no rotation of the gesture input device is sensed by the rotation sensor, the controller may change illumination of the light emitter.

The inclined section may comprise a plurality of gradations that are embossed or engraved.

The inclined section may be integrated into the curved section, and be physically rotatable simultaneously with the curved section.

The gesture input device may be configured to be pressed.

The center portion of the gesture input device may be configured to be pressed, to be tilted in four directions of a up direction, a down direction, a left direction, and a right direction or in more directions, and to receive different signals according to pressing operation and tilting operation.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 12 is a flowchart illustrating a method of controlling the input device according to an embodiment of the present disclosure.

DETAILED DESCRIPTION

Figure 1:
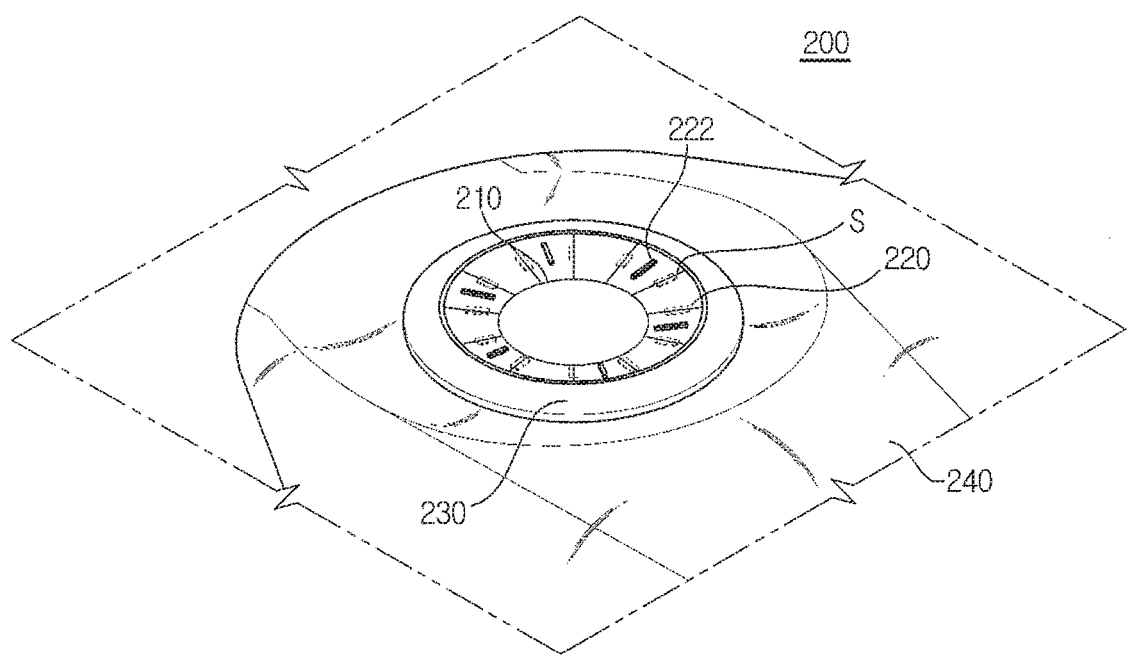
FIG. 1 is a perspective view of an input device according to an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

FIG. 1 is a perspective view of an input device according to an embodiment of the present disclosure.

Referring to FIG. 1, an input device 200 may include touch portions 210 and 220 to receive a user's gesture, and a border portion 230 surrounding the touch portions 210 and 220.

The touch portions 210 and 220 may be a touch pad to generate a signal when a user contacts or approaches it using a pointer, such as his/her finger or a touch pen. The user may make a predetermined touch gesture on the touch portions 210 and 220 to input a desired instruction or command.

The touch pad may be a touch film or a touch sheet including a touch sensor, regardless of its name. Also, the touch pad may be a touch panel which is a display capable of detecting a touch operation on a screen.

A touch operation of making a pointer approach a touch pad so as for the pointer to be at the proximity of the touch pad without being in contact with the touch pad in order to recognize the location of the pointer is called "proximity touch", and a touch operation of making a pointer contact a touch pad in order to recognize the location of the pointer is called "contact touch". The location of a pointer at which proximity touch is recognized may be a location at which the pointer approaches a touch pad to be vertical to the touch pad.

The touch pad may be a resistive type touch pad, an optical type touch pad, a capacitive type touch pad, an ultrasonic type touch pad, or a pressure type touch pad. That is, the touch pad may be one of various kinds of touch pads well-known in the art.

The touch portions 210 and 220 may be implemented as a gesture input device to enable the user to input a gesture by touching it. The touch portions 210 and 220 may include a curved section 210 formed in the shape of a concave, a curved surface in the center portion, and an inclined section 220 formed around the curved section 210.

The inclined section 220 may be physically rotated in a clockwise direction or in a counterclockwise direction, together with or independently from the curved section 210. If the user rotates the inclined section 220 physically in the clockwise direction or in the counterclockwise direction, the inclined section 220 may rotate independently from the border portion 230 and a wrist supporting portion 240. The surface of the inclined section 210 may be made of a material having a high friction coefficient so that the user can easily rotate the inclined section 220 physically using his/her finger's friction force while pressing a part of the inclined section 220. Hereinafter, for convenience of description, the inclined section 220 is assumed to be physically rotatable in the clockwise direction or in the counterclockwise direction independently from the curved section 210.

The touch portions 210 and 220 may further include a rotation sensor (not shown) to sense a degree of physical rotation of the inclined section 220. The rotation sensor may be disposed at any location, such as the inside of the touch portions 210 and 220 or below the touch portions 210 and 220, as long as it can sense a degree of physical rotation of the inclined section 220.

On the surface of the inclined section 220, at least one rib 222 may be formed to prevent the user's finger from departing from the inclined section 220, and on the rear surface of the inclined section 220, at least one touch sensor S may be disposed to sense the user's touch input.

The rib 222 may prevent the user's finger from slipping on or departing from the inclined section 220. Since the rib 222 is provided on the surface of the inclined section 220, the user's finger may be caught by the rib 222 when the user rotates the inclined section 220 physically to thereby be prevented from slipping on or departing from the inclined section 220.

The touch sensor S may sense a touch input applied on the inclined section 220. The touch input may include "proximity touch" of making a pointer (that is, a finger) approach the inclined section 220 so as for the pointer to be at the proximity of the inclined section 220 without being in contact with the inclined section 220 in order to recognize the location of the pointer, and "contact touch" of making a pointer contact the inclined section 220 in order to recognize the location of the pointer. The location of a pointer at which proximity touch is recognized may be a location at which the pointer approaches the inclined section 220 to be vertical to the inclined section 220.

A plurality of touch sensors S may sense a touch input independently over the entire area of the inclined section 220.

The touch sensor S may be provided on the rear surface of the curved section 210, as well as on the rear surface of the inclined section 220.

The touch sensor S used in the touch portions 210 and 220 may recognize a touch input using an optical method. For example, an Infrared Light Emitting Diode (IR LED) and a photodiode array may be disposed on the rear surface of the touch portions 210 and 220. The IR LED and the photodiode may acquire an infrared image reflected by a finger, and a controller may extract a touch point from the acquired image.

The border portion 230 means an area surrounding the touch portions 210 and 220, and may be provided as a separate member from the touch portions 210 and 220.

The input device 200 according to an embodiment of the present disclosure may further include the wrist supporting portion 240 disposed below the gesture input device, and configured to support the user's wrist. The wrist supporting portion 240 may be positioned higher than the gesture input device, that is, the touch portions 210 and 220. Since the wrist supporting portion 240 is positioned higher than the touch portions 210 and 220, the wrist supporting portion 240 may prevent the user's wrist from being bent, when he/she inputs a gesture to the touch portions 210 and 220 with his/her finger while putting his/her wrist on the wrist supporting portion 240. Accordingly, the wrist supporting portion 240 may protect the user from musculoskeletal system disorder, while offering a good operation feeling.

Figure 2:
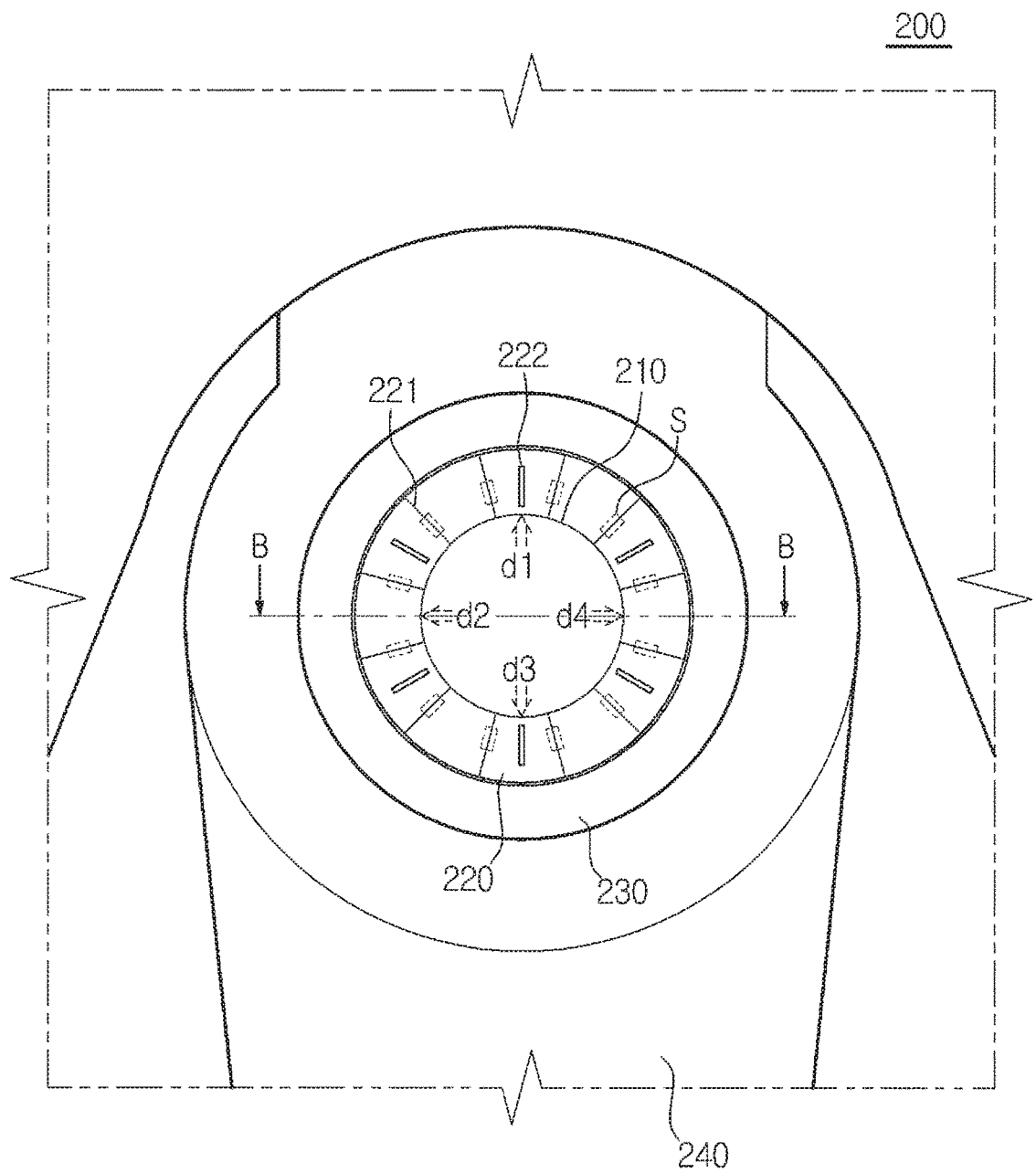
FIG. 2 is a top view showing an input device according to an embodiment of the present disclosure.
Figure 3:
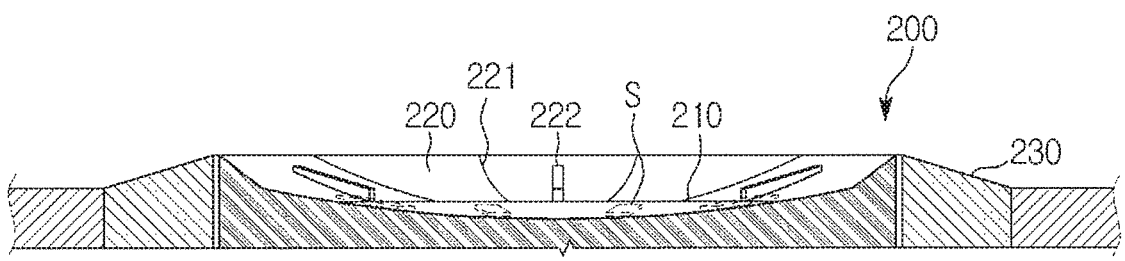
FIG. 3 is a cross-sectional view of the input device cut along a line B-B of FIG. 2.

FIG. 2 is a top view showing an input device according to an embodiment of the present disclosure, and FIG. 3 is a cross-sectional view of the input device cut along a line B-B of FIG. 2.

The touch portions 210 and 220 may include an area that is lower than the boundary line with the border portion 230. That is, the touch surface of the touch portions 210 and 220 may be lower than the boundary line with the border portion 230. For example, the touch surface of the touch portions 210 and 220 may be inclined downward from the boundary line with the border portion 230, or the touch surface of the touch portions 210 and 220 may have a step with respect to the boundary line with the border portion 230. For example, as shown in FIG. 3, the touch portions 210 and 220 may include the curved section 210 formed in the shape of a concave, curved surface.

Since the touch portions 210 and 220 include an area lower than the boundary line with the border portion 230, the user can recognize the area of the touch portions 210 and 220 and the boundary line with his/her tactile impression. A gesture may be recognized with a high recognition rate, when it is input onto the center area of the touch portions 210 and 220. When the user made similar gestures at different locations, there is a risk that the gestures are recognized as different commands. The problem may occur when the user makes a gesture without fixing his/her eyes at the touch portions 210 and 220. Accordingly, if the user can intuitively identify the touch portions 210 and 220 and the boundary line with his/her tactile impression when he/she makes a gesture while seeing the display or focusing his/her attention on an external situation, the user will be able to input a gesture at an exact location. This will improve the accuracy of a gesture input.

The touch portions 210 and 220 may include a concave area. Herein, the term "concave" means a hollow or depressed shape, and may also include a tilted or stepped shape, as well as a round depressed shape.

For example, the touch portions 210 and 220 may include a concave, curved surface.

The curved section 210 of the touch portions 210 and 220 according to the current embodiment of the present disclosure may be a concave, curved surface having a predetermined curvature. The concave, curved surface of the touch portions 210 and 220 may have different curvatures according to area. For example, the center area of the concave, curved surface may have a relatively small curvature (a great radius of curvature), and the outer area of the concave, curved surface may have a relatively great curvature (a small radius of curvature).

Since the touch portions 210 and 220 include the concave, curved surface, the user can feel improved touch sensation when making a gesture on the touch portions 210 and 220. The curved surface of the curved section 210 may similarly correspond to a trajectory drawn by a user fingertip's movement occurring when the user moves his/her finger while fixing his/her wrist or when the user rotates or twists his/her wrist while spreading out his/her fingers.

Comparing to a conventional flat-type touch input unit, the touch portions 210 and 220 having the concave, curved surface according to the current embodiment may be ergonomically designed.

That is, the touch portions 210 and 220 having the concave, curved surface can reduce fatigue that is applied to the user's wrist, while improving the user's touch sensation. In addition, the touch portions 210 and 220 may enable the user to accurately make a gesture, compared to when the user makes a gesture on a flat-type touch input unit.

The touch portions 210 and 220 may have a circular shape. If the touch portions 210 and 220 have a circular shape, it may be easy to form a concave, curved area in the touch portions 210 and 220. If the touch portions 210 and 220 have a circular shape, the user can easily identify the touch area of the touch portions 210 and 220 with his/her tactile feeling so as to easily make rolling or spin operations, and to easily rotate the touch portions 210 and 220 physically in the clockwise direction or in the counterclockwise direction.

Since the touch portions 210 and 220 are curved, the user can intuitively recognize which location of the touch portions 210 and 220 his/her finger is positioned at. If the touch portions 210 and 220 are curved, all points of the touch portions 210 and 220 may have different gradients. Accordingly, the user can intuitively recognize which location of the touch section 110 his/her finger touches, through a sense of gradient felt by the finger.

That is, the curved shape of the touch portions 210 and 220 can provide the user with a feedback about which location of the touch portion 210 and 220 his/her finger touches, when the user makes a gesture on the touch portions 210 and 220 while fixing his/her eyes at some other place instead of the touch portions 210 and 220, thereby helping the user make his/her desired gesture and improving the accuracy of gesture inputs.

The touch portions 210 and 220 may be ergonomically designed in view of diameter and depth. For example, the diameter of the touch portions 210 and 220 may range from 50 mm to 80 mm.

A length to which an adult can move his/her finger naturally without moving his/her wrist may be about 80 mm in consideration of an adults average finger length. Accordingly, if the diameter of the touch portions 210 and 220 exceeds 80 mm, the user may have to move his/her hand unnaturally and move his/her wrist more than necessary, when drawing a circle on the inclined section 220.

In contrast, if the diameter of the touch portions 210 and 220 is smaller than 50 mm, the touch area of the touch portions 210 and 220 is reduced, resulting in difficulties in making various gestures on the touch area. Also, when a gesture is made on the small touch area, the probability that the gesture will be wrongly recognized will increase.

When the touch portions 210 and 220 have a spherical shape, a ratio of the depth with respect to the diameter of the touch portions 210 and 220 may range from 0.04 to 0.1. A value obtained by dividing the depth of the touch portions 210 and 220 by the diameter of the touch portions 210 and 220 represent a curvature of the touch portions 210 and 220.

That is, as the ratio of the depth with respect to the diameter of the touch portions 210 and 220 is greater, the more curved the touch portions 210 and 220 appear, and as the ratio of the depth with respect to the diameter of the touch portions 210 and 220 is smaller, the more flat the touch portions 210 and 220 appear.

If the ratio of the depth with respect to the diameter of the touch portions 210 and 220 is greater than 0.1, a curvature of the concave area may increase, which may degrade the user's touch sensation. The curvature of the concave area of the touch portions 210 and 220 may be identical to the curvature of a curve drawn by a user's fingertip when the user moves his/her finger naturally. However, if the ratio of the depth with respect to the diameter of the touch portions 210 and 220 is greater than 0.1, a user may have to flex his/her finger more than necessary when moving the finger along the curved surface of the touch portions 210 and 220, which may make the user get artificial operating feeling. Also, when the user moves his/her finger unconsciously, the user's fingertip may be taken off the curved surface of the touch portions 210 and 220. In this case, the user's gesture may be wrongly recognized.

When the depth of the touch portions 210 and 220 is too low, the user will be not able to obtain the advantage of the curved surface, compared to a flat surface. If the ratio of the depth with respect to the diameter of the touch portions 210 and 220 is smaller than 0.04, the user will be not able to feel a difference in operation sensation, compared to when making a gesture on a flat type touch input unit.

The touch portions 210 and 220 according to the current embodiment may include the inclined section 220 inclined downward toward the circumference of the curved section 210. If the touch portions 210 and 220 have circular shapes, the curved section 210 may be a part of a spherical surface, and the inclined section 220 may surround the circumference of the curved section 210.

The inclined section 220 may include gradations 221. The gradations 221 may visually or tactilely inform the user of a relative location. For example, the gradations 221 may be embossed or engraved. The gradations 221 may be arranged at regular intervals. Accordingly, the user can intuitively recognize the number of gradations through which his/her finger passes while making a swype operation so as to accurately adjust the length of the swype gesture. The swype means operation of inputting a gesture while keeping a pointer in contact with the touch pad, without physically rotating the inclined section 220.

A gradient of the inclined section 220 according to an embodiment may be greater than a gradient in the direction of tangent of the inclined section 220 with respect to the boundary line between the inclined section 220 and the curved section 210. Since the inclined section 220 is more steeply inclined than the curved section 210, the user may intuitively identify the touch area of the curved section 210. Meanwhile, while a gesture is made on the curved section 210, no touch input applied on the inclined section 220 may be recognized. Accordingly, when the user makes a gesture on the curved section 210 until reaching the boundary line with the inclined section 220, the gesture input made on the curved section 210 may not overlap with any swype gesture input made on the inclined section 220.

The inclined section 220 may be integrated into the curved section 210. A plurality of touch sensors S may be respectively installed in the curved section 210 and the inclined section 220, or a touch sensor S may be installed in the curved section 210 and the inclined section 220. If the curved section 210 and the inclined section 220 include a touch sensor S, the controller may distinguish the touch area of the curved section 210 from the touch area of the inclined section 220 to distinguish a touch input applied on the curved section 210 from a touch input applied on the inclined section 220.

The input device 200 may include the controller configured to recognize physical rotation of the inclined section 220, to recognize a touch input applied onto the touch portion 210 and 220, and to analyze the physical rotation and the touch input to issue commands to various components.

The controller may move a cursor or menu displayed on the display according to the physical rotation of the inclined section 220. That is, if the inclined section 220 rotates physically in the clockwise direction, the controller may move a cursor displayed on the display in the clockwise direction, and if the inclined section 220 rotates physically in the counterclockwise direction, the controller may move a cursor displayed on the display in the counterclockwise direction.

The controller may move a cursor or a menu on the display according to the movement of a pointer moving on the curved section 210. That is, if the pointer moves from up to down on the curved section 210, the controller may move a cursor from up to down on the display, or move a preliminarily selected menu from the upper menu to the lower menu.

The controller may analyze a trajectory along which the pointer moves to correspond the analyzed trajectory to a pre-defined gesture, and execute a command corresponding to the gesture. The gesture may be made upon the pointer's flicking, rolling, spinning, or tapping. The user may make a gesture using one of various touch input methods.

The flicking means a touch input method of touching the curved section 210 with a pointer, dragging the pointer in a predetermined direction, and then taking the pointer off the curved section 210, the rolling means a touch input method of drawing a circular arc with respect to the center of the curved section 210, the spinning means a touch input method of drawing a circle with respect to the center of the curved section 210, and the tapping means a touch input method of tapping the curved section 210.

The controller may adjust the height of the rib 222 according to whether a touch input is recognized from the inclined section 220, and whether operation of physically rotating the touch portions 210 and 220 is sensed. More specifically, if the inclined section 220 does not rotate physically (that is, when the inclined section 220 stops) although a touch input is recognized from the inclined section 220, the controller may raise the height of the rib 222. If no touch input is recognized from the inclined section 220, and no operation of physically rotating the inclined section 220 is sensed, the controller may lower the height of the rib 222 to return the rib 222 to its original position. In order to adjust the height of the rib 222, the input device 200 according to an embodiment of the present disclosure may adopt a motor for raising or lowering the rib 222.

The controller may include memory to store data and programs for controlling the input device 200, the display, etc., and a processor to generate control signals according to the programs and data stored in the memory.

The user may input a gesture using a multi-pointer input method. The multi-pointer input method is to make a gesture by simultaneously or sequentially touching the touch portions 210 and 220 with two pointers. For example, the user may input a gesture by touching the touch portions 210 and 220 with his/her two fingers. By using the multi-pointer input method in addition to a single-pointer input method, the user can input various gestures to issue various commands or instructions.

Further, the user may draw a character, a figure, a symbol, etc. on the curved section 210 to make a gesture. For example, the user may draw alphabets, arabic numerals, or symbols of four arithmetical operations. Since the user can himself/herself input characters or numerals that he/she wants to input, it is possible to reduce a time taken to input characters or numerals and to provide a more intuitive interface.

The touch portions 210 and 220 may allow pressing operation or tilting operation. The user may apply pressure to the touch portions 210 and 220 to press or tilt a part of the touch sections 210 and 220 to thereby input an execution signal. The pressing operation may include operation of pressing the touch portion 210 and 220 evenly, and operation of pressing the touch portions 210 and 220 obliquely. If the touch portions 210 and 220 are flexible, it is also possible to press a part of the touch portions 210 and 220.

For example, the touch portions 210 and 220 may be tilted in at least one direction d1 to d4 with respect to its central axis. For example, as shown in FIG. 2, the touch portions 210 and 220 may be tilted in up, down, left, and right directions d1 to d4. However, the touch portions 210 and 220 may be tilted in other various directions. When the center area d5 of the touch portions 210 and 220 is pressed, the touch portions 210 and 220 may be pressed evenly.

The user may apply pressure to the input device 200 to press or tilt the input device 200 to thereby input a predetermined instruction or command. For example, the user may press the center area d5 of the touch portions 210 and 220 to select a menu, and may press the upper area d1 of the touch portions 210 and 220 to move the cursor upward.

If the rib 222 is disposed on the upper surface of the inclined section 220, and raised, the user's finger may be prevented from departing from the inclined section 220. That is, if the rib 222 is raised on the inclined section 220, the user's finger may be caught by the rib 222 when the user rotates his/her finger in one direction in order to physically rotate the inclined section 220, so as to be prevented from slipping on or departing from the inclined section 220.

Figure 4:
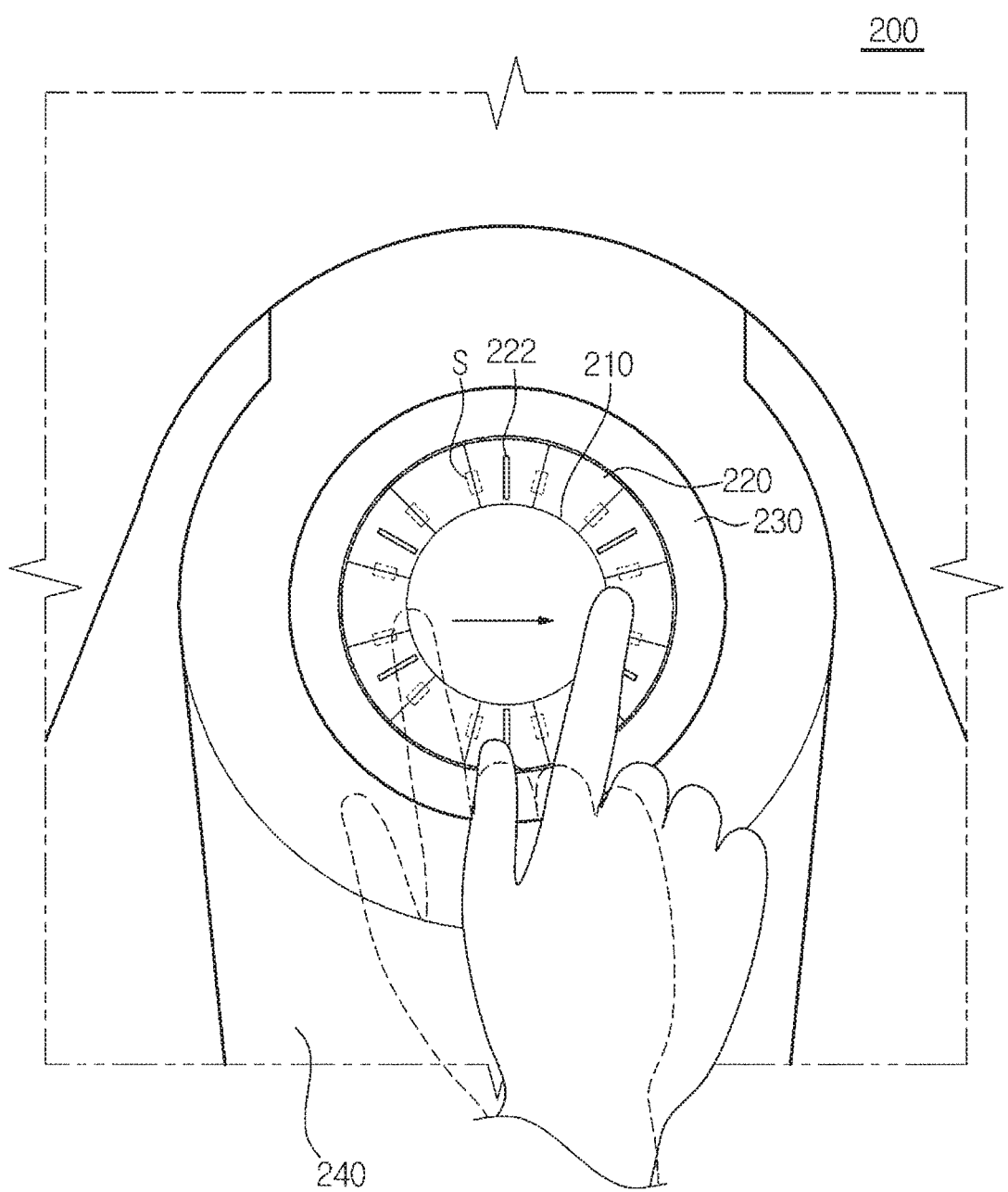
FIG. 4 is a top view of the input device for describing operation of inputting a flicking gesture of moving a pointer from left to right.
Figure 5:
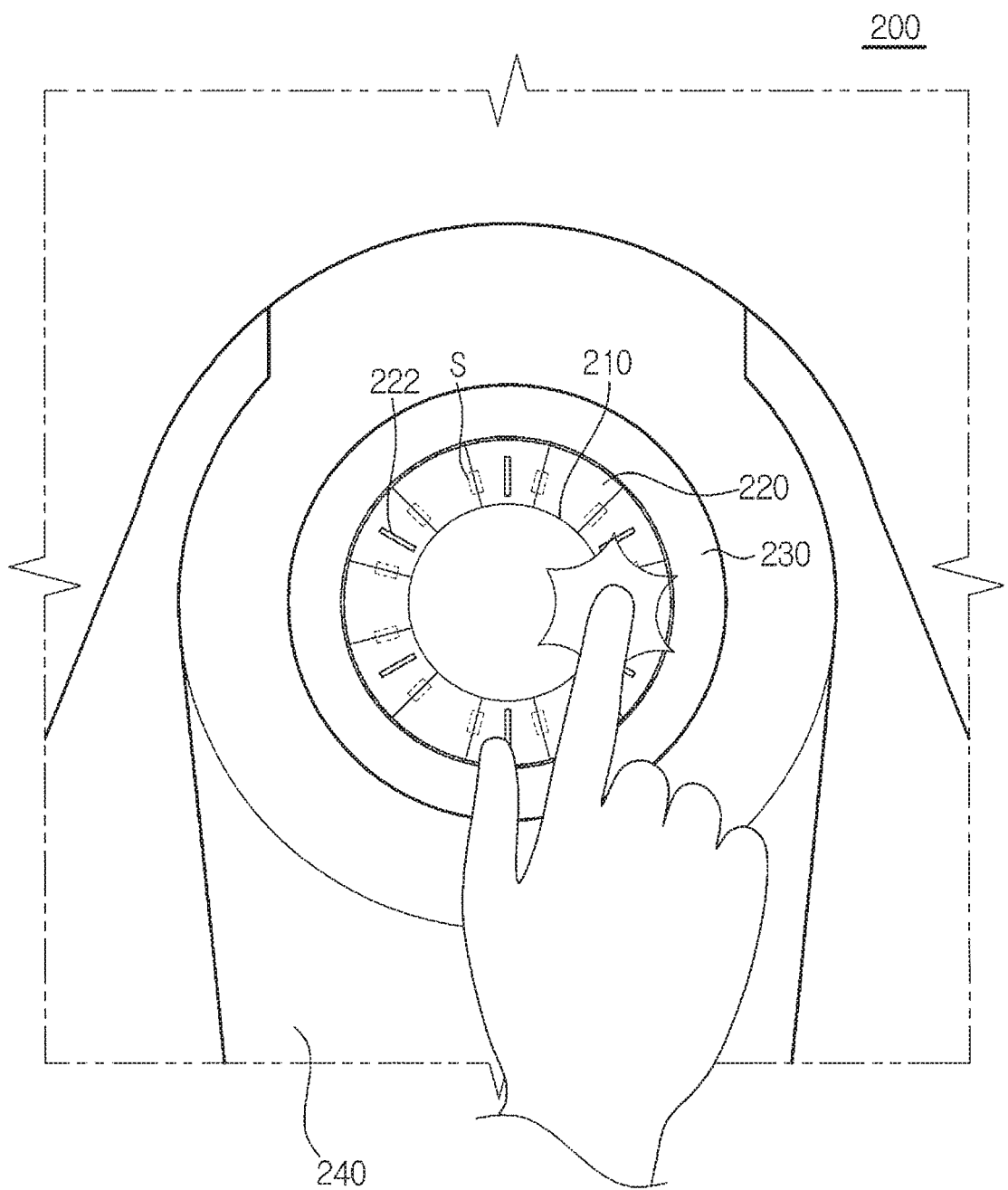
FIG. 5 is a top view of the input device for describing operation of inputting a tap gesture of tapping the right area of a curved section.
Figure 6:
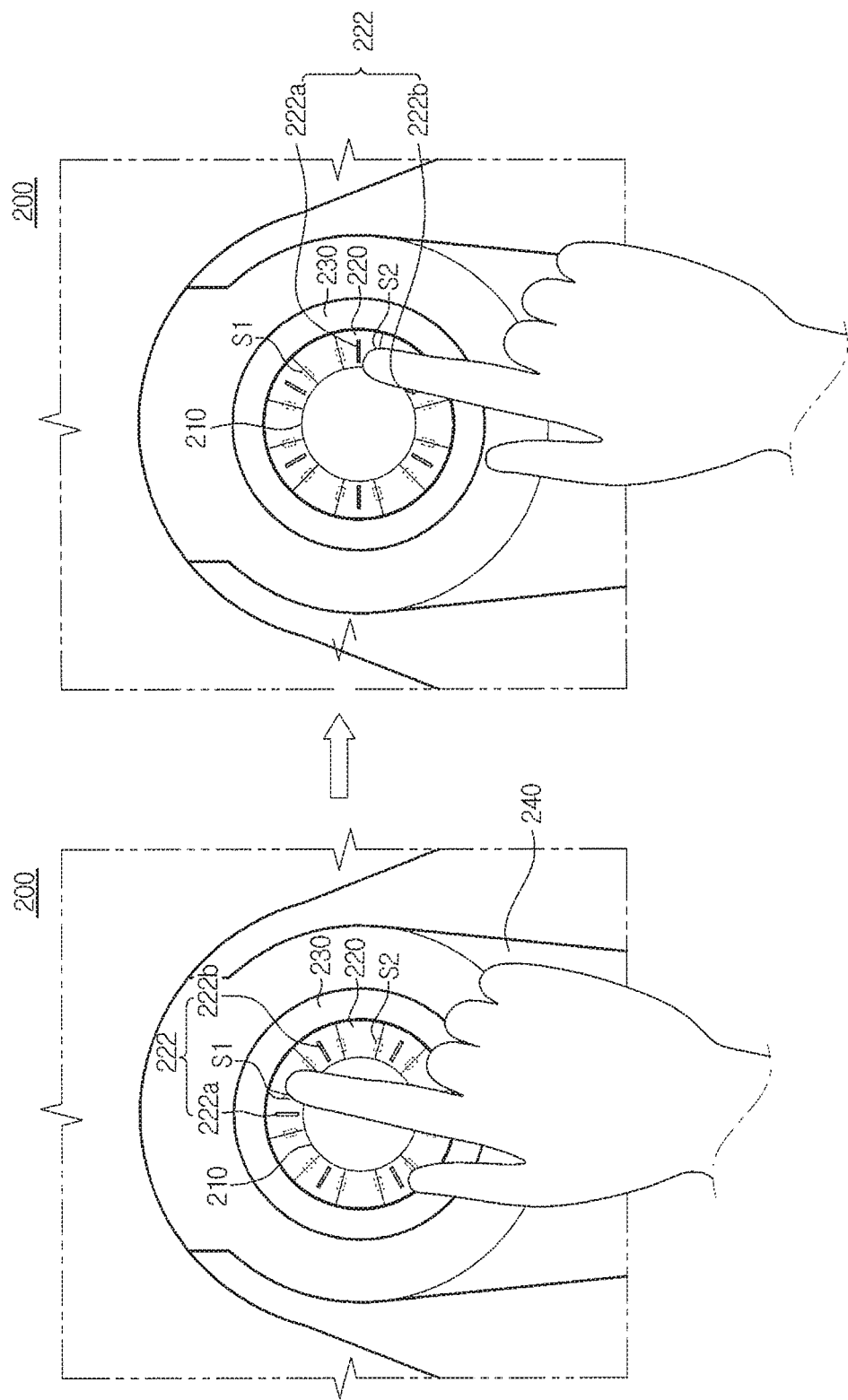
FIG. 6 is a top view of the input device for describing operation in which a user physically rotates an inclined section.

FIGS. 4 to 6 are views for describing operation of manipulating the input device according to an embodiment of the present disclosure. FIG. 4 is a top view of the input device for describing operation of inputting a flicking gesture of moving a pointer from left to right, and FIG. 5 is a top view of the input device for describing operation of inputting a tap gesture of tapping the right area of a curved section.

Referring to FIG. 4, the user may input a flicking gesture on the curved section 210. The flicking gesture may be sensed by the touch sensor S provided on the rear surface of the curved section 210, which is not shown in the drawings. The flicking gesture may be one of various unidirectional gestures of moving a pointer from a point to another point.

Referring to FIG. 5, the user may touch a part of the curved section 210 to thereby input an operation command.

Meanwhile, the input device 200 may install various components related to operations therein. The input device 200 may include a structure of enabling the touch portions 210 and 220 to be pressed or tilted in the above-mentioned five directions d1 to d5, a structure of enabling the touch portions 210 and 220 to rotate physically, and a structure of enabling the rib 222 to move upward or downward.

Various semiconductor chips and a PCB may be installed in the input device 200. Meanwhile, the semiconductor chips may be mounted on the PCB. The semiconductor chips may perform data processing or store data. The semiconductor chips may interpret a predetermined electrical signal generated according to an external force applied to the input device 200, physical rotation of the touch portions 210 and 220, or a gesture recognized by the touch portions 210 and 220, generate a predetermined control signal according to the result of the interpretation, and then transfer the predetermined control signal to a controller of another device, the display, etc.

Hereinafter, a process of controlling the input device 200 according to an embodiment of the present disclosure will be described with reference to FIGS. 6 to 9.

Figure 7:
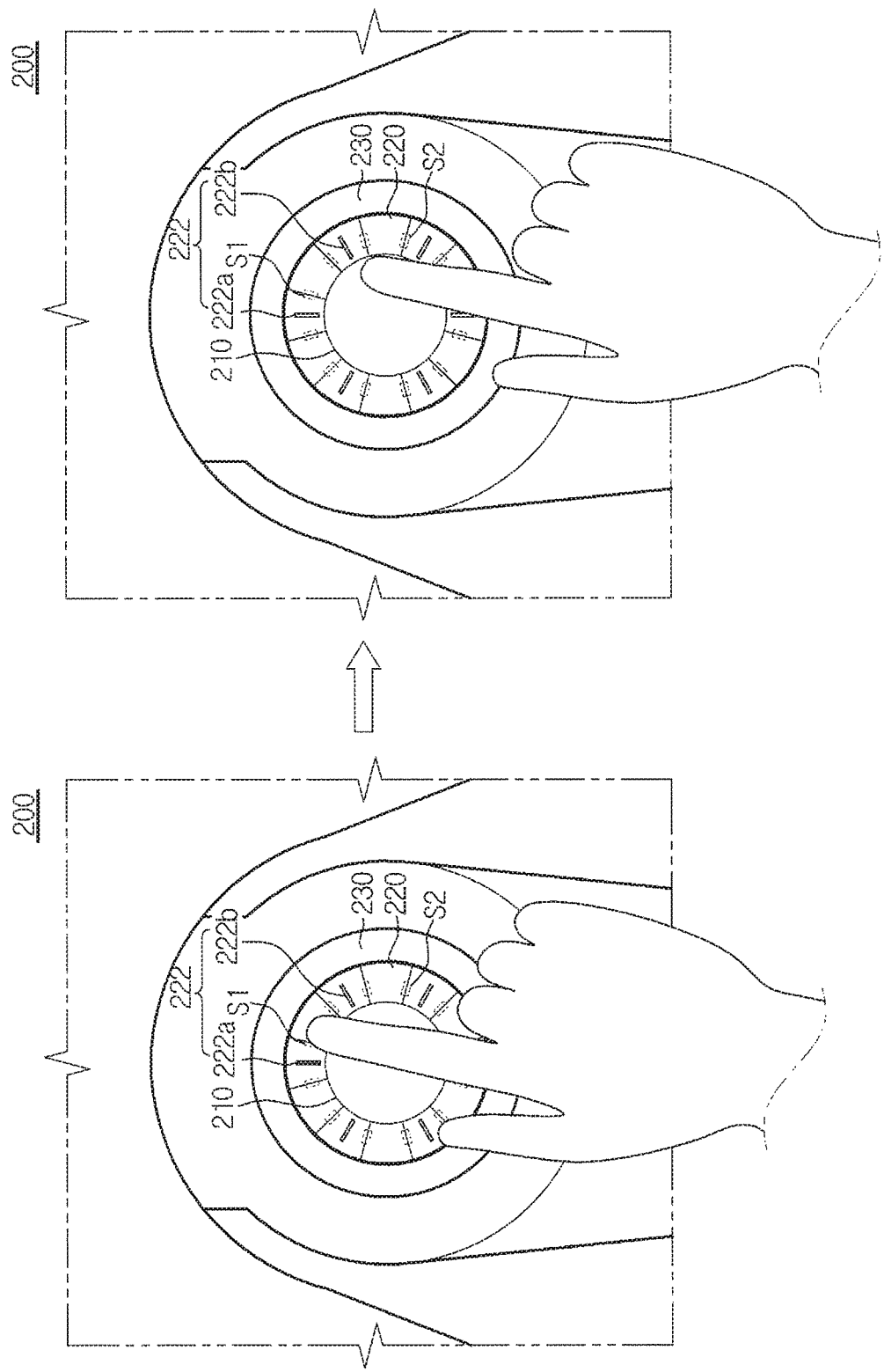
FIG. 7 is a top view of the input device for describing a case in which a finger slips.
Figure 8:
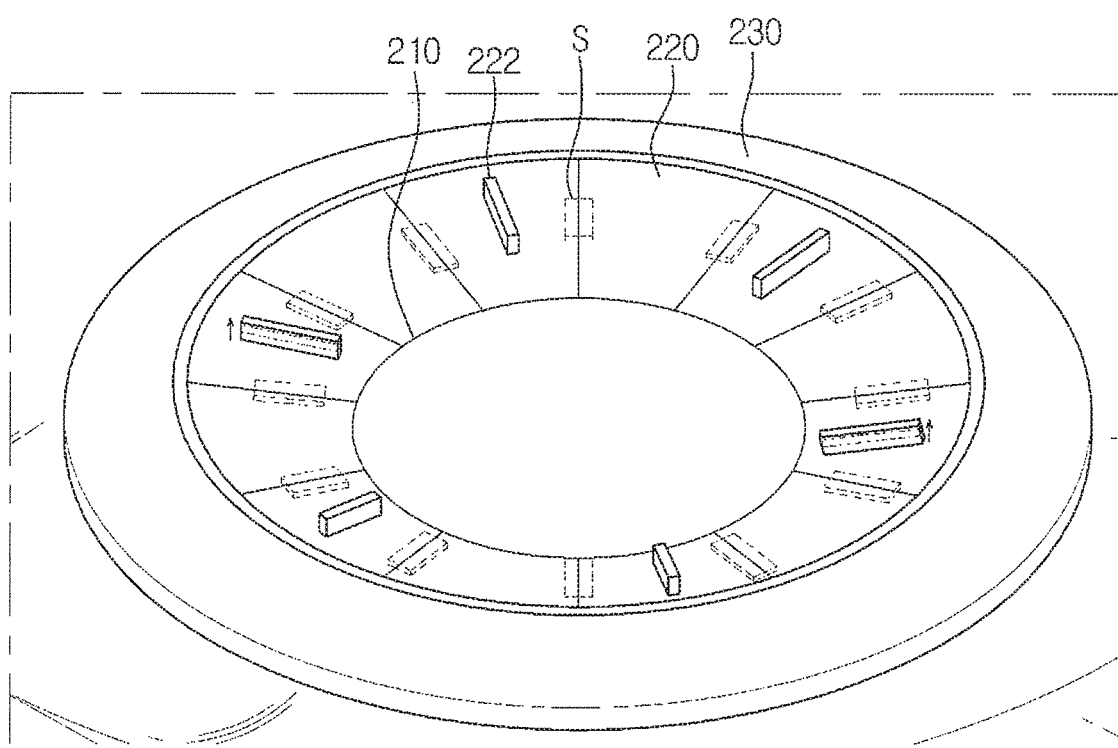
FIG. 8 is a perspective view of an input device according to an embodiment of the present disclosure.
Figure 9:
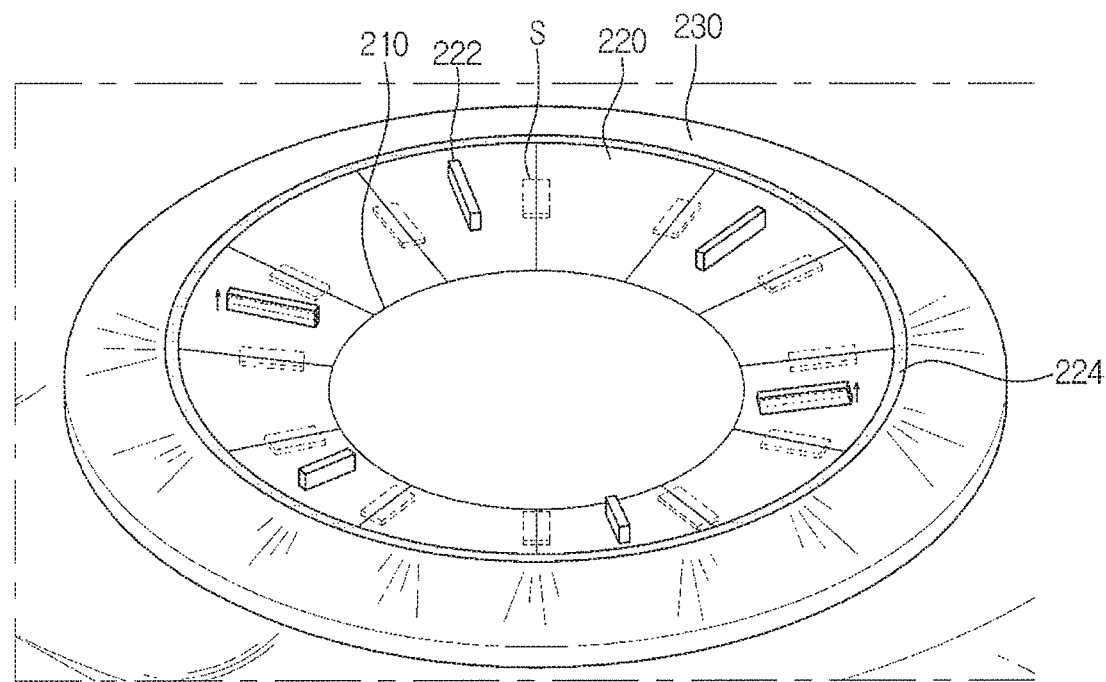
FIG. 9 is a perspective view of an input device according to another embodiment of the present disclosure.

FIG. 6 is a top view of the input device for describing operation in which a user physically rotates an inclined section, FIG. 7 is a top view of the input device for describing a case in which a finger slips, FIG. 8 is a perspective view of an input device according to an embodiment of the present disclosure, and FIG. 9 is a perspective view of an input device according to another embodiment of the present disclosure.

Referring to FIG. 6, if a user rotates the inclined section 220 physically using his/her finger's friction force while pressing a part of the inclined section 220, a touch input may be sensed by a plurality of touch sensors from a touch sensor s1 to another touch sensor s2, and the rotation sensor may also sense the physical rotation of the inclined section 220.

However, referring to FIG. 7, when a user presses a part of the inclined section 220 with his/her finger, and then moves his/her finger to another part of the inclined section 220 in order to rotate the inclined section 220, the user's finger may move to the other part of the inclined section 220 without rotating the inclined section 220, due to an insufficient friction force. In this case, a touch input may be sensed by a plurality of touch sensors from a touch sensor s1 to another touch sensor s2, however, the rotation sensor may sense no physical rotation of the inclined section 220 (that is, a case of inputting a swype gesture).

In order to prevent the problem, referring to FIG. 8, if a touch input is sensed by a plurality of touch sensors from a touch sensor s1 to another touch sensor s2 provided on the rear surface of the inclined section 220, and the rotation sensor senses no physical rotation of the inclined section 220 (that is, if a swype gesture is input), the controller of the input device 200 according to an embodiment of the present disclosure may raise the rib 222.

If no touch input is sensed by the touch sensors S, and no physical rotation of the inclined section 220 is sensed by the rotation sensor, the controller may lower the rib 222 to return the rib 222 to its original position.

Referring to FIG. 9, the input device 200 according to another embodiment of the present disclosure may further include a light emitter 224 disposed outside the inclined section 220 and configured to emit light according to a control signal from the controller. If a swype gesture is sensed from the inclined section 220 by the touch sensors S, and no rotation of the inclined section 220 is sensed by the rotation sensor, the controller may control the light emitter 224 to emit light, or may change the illumination of the light emitter 224. Herein, changing the illumination of the light emitter 224 may be to change the color, brightness, etc. of illumination irradiated by the light emitter 224.

Figure 10:
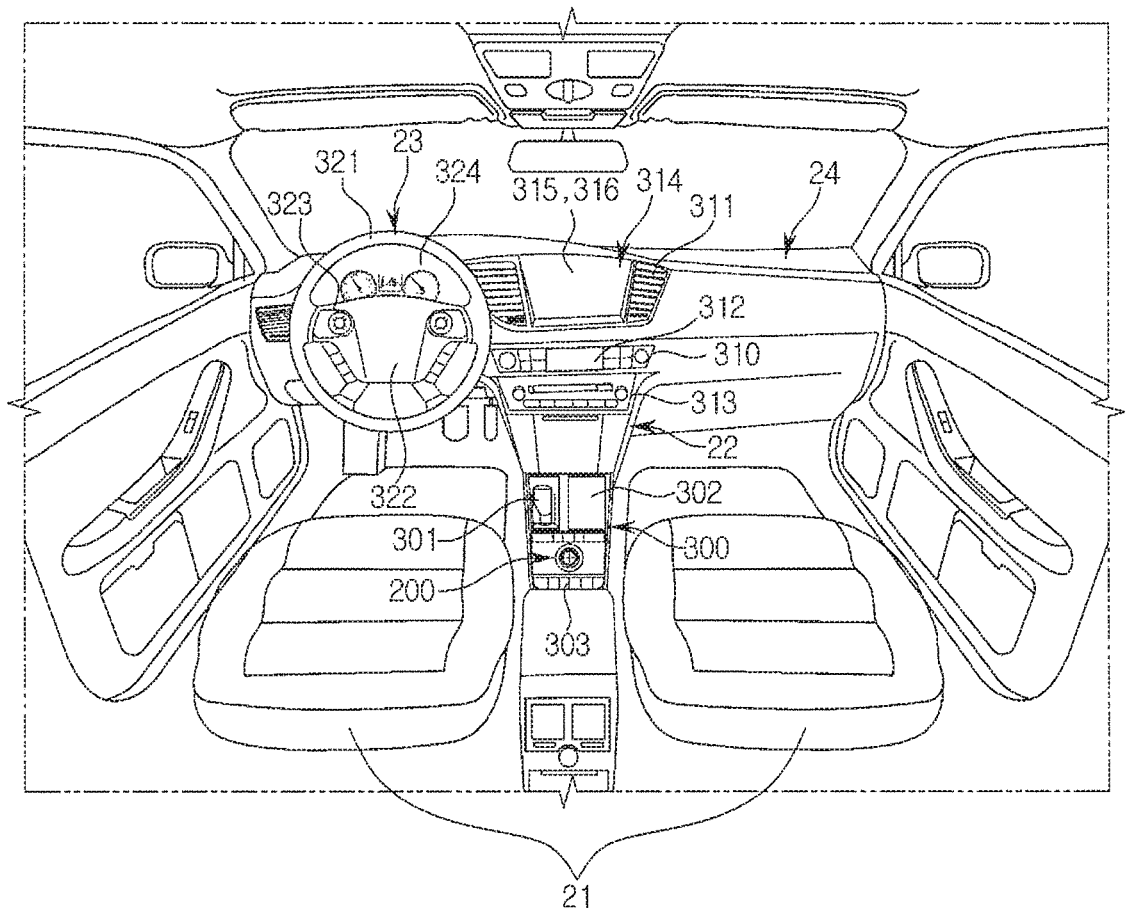
FIG. 10 shows the interior of a vehicle in which the input device according to an embodiment of the present disclosure is installed.
Figure 11:
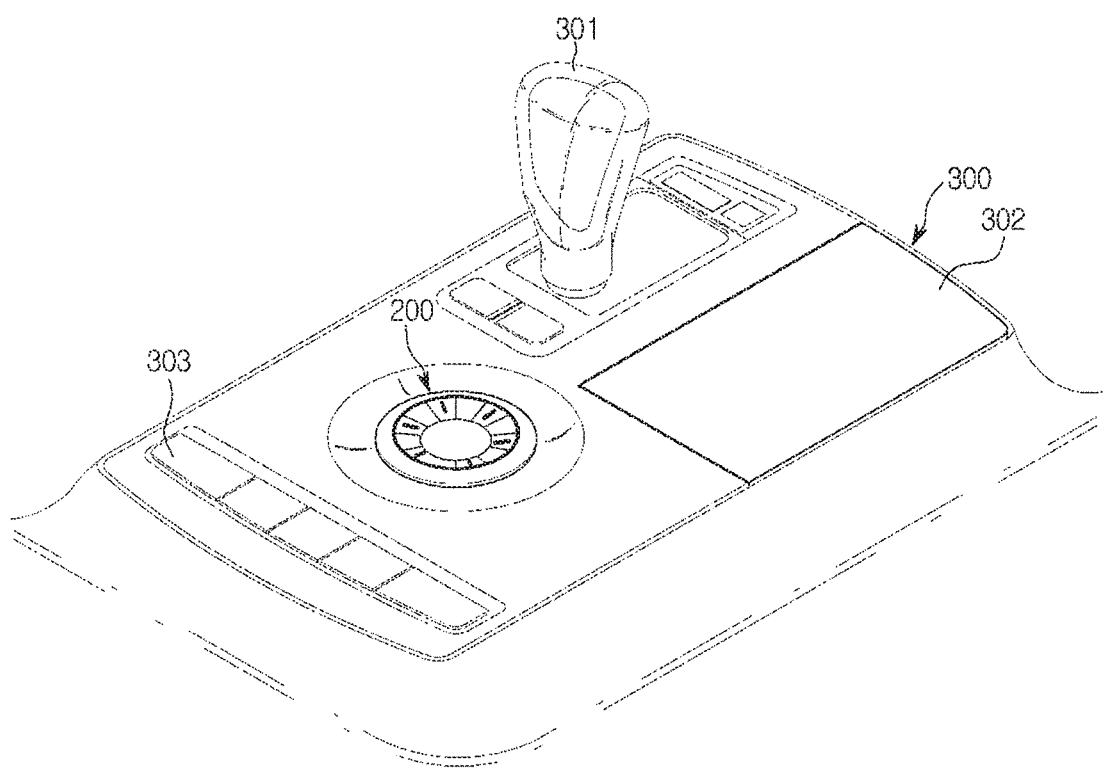
FIG. 11 is a perspective view of a gear box in which the input device according to an embodiment of the present disclosure is installed.

FIG. 10 shows the interior of a vehicle in which the input device according to an embodiment of the present disclosure is installed, and FIG. 11 is a perspective view of a gear box in which the input device according to an embodiment of the present disclosure is installed.

Referring to FIG. 10, a vehicle 20 may include a plurality of seats S1 and S2 in which a driver, etc. sit, and a dashboard 24 on which a gear box 300, a center fascia 22, a steering wheel 23, etc. are arranged.

In the center fascia 22, an air conditioner 310, a clock 312, audio system 313, and AVN system 314 may be installed.

The air conditioner 310 may adjust the temperature, humidity, air quality, and flow of air inside the vehicle 20 to maintain the inside of the vehicle 20 pleasant. The air conditioner 310 may be installed in the center fascia 22, and may include at least one vent 311 for discharging air. In the center fascia 22, at least one button or dial for controlling the air conditioner 310, etc. may be provided. A user such as a driver may use the button provided on the center fascia 22 to control the air conditioner 310.

The clock 312 may be disposed around the button or dial for controlling the air conditioner 310.

The audio system 313 may include an operating panel on which a plurality of buttons for performing various functions are arranged. The audio system 313 may provide a radio mode to provide a radio function, and a media mode to reproduce an audio file stored in storage medium that stores audio files.

The AVN system 314 may be embedded into the center fascia 22 of the vehicle 20, or protrude from the dashboard 24. The AVN system 314 may be equipment capable of executing an audio function, a video function, and a navigation function according to a user's manipulation. The AVN system 314 may include an input device 315 to receive a user's command for the AVN system 314, and a display 316 to display a screen related to the audio function, a screen related to the video function, and a screen related to the navigation function. The audio system 313 may be omitted if the AVN system 314 can perform the functions of the audio system 313.

The steering wheel 23 may be an apparatus for changing the driving direction of the vehicle 20, and include a rim 321 that can be gripped by a driver, and a spoke 322 connected to a steering apparatus of the vehicle 20 and connecting the rim 321 to a hub of a rotation shaft for steering. According to an embodiment, the spoke 322 may include an operating device 323 for controlling various apparatuses (for example, audio system) of the vehicle 20.

The dashboard 24 may further include an instrument panel 324 to inform the driver of speed, a driving distance, revolutions per minute (RPM), an amount of oil, temperature of cooling water, various warnings, etc., and a globe box 325 to store various things.

The gear box 300 may be located between a driver seat and a passenger seat inside the vehicle 20, and operating devices while the driver needs to manipulate during driving may be installed in the gear box 300.

Referring to FIG. 11, the gear box 300 may include a transmission lever 301 to shift gears of the vehicle 20, a display 302 to control function execution of the vehicle 20, and a button 303 to execute the functions of various devices of the vehicle 20. Also, the input device 200 according to an embodiment of the present disclosure may be installed in the gear box 300.

The input device 200 may be installed in the gear box 300 so that the driver can manipulate the input device 200 during driving while keeping his/her eyes forward. For example, the input device 200 may be positioned behind the transmission lever 301. The input device 200 may be disposed in the center fascia 22, the passenger seat, or the back seat.

The input device 200 may be connected to displays located inside the vehicle 20 to select or execute various icons displayed on the displays.

The displays located inside the vehicle 20 may include the audio system 313, the AVN system 314, or the instrument panel 324. The display 302 may be installed in the gear box 300, as necessary. The display 302 may be connected to a head up display (HDU) or side-view mirrors.

For example, the input device 200 may move a cursor displayed on the display 302, or execute an icon displayed on the display 302. The icon may include a main menu, a selection menu, and a setting menu. The user may operate navigation system, set driving conditions of the vehicle 20, or execute the functions of the peripheral devices of the vehicle 20, through the input device 200.

The display 302 may be the display described above with reference to FIGS. 1 to 9.

A method of controlling the input device 200 according to an embodiment of the present disclosure will be described with reference to FIG. 12. FIG. 12 is a flowchart illustrating a method of controlling the input device according to an embodiment of the present disclosure.

Referring to FIG. 12, if a touch input is sensed by a plurality of touch sensors from a touch sensor s1 to another touch sensor s2 of the inclined section 220 ("Yes" in operation 1110), the controller of the input device 200 according to an embodiment of the present disclosure may sense physical rotation of the inclined section 220 through the rotation sensor, in operation 1120.

If the inclined section 220 physically rotates ("Yes" in operation 1120), the controller may calculate a rotation value corresponding to the physical rotation of the inclined section 220, and move a cursor displayed on the screen of the display by the rotation value, in operation 1150. However, if the inclined section 220 does not rotate physically ("No" in operation 1120), the controller may raise the rib 222, in operation 1130.

In this case, according to another embodiment, the controller may raise the rib 222, and simultaneously change the illumination of the light emitter 224, in operation 1130.

However, if no touch input is sensed by the touch sensors S, and no rotation of the inclined section 220 is sensed by the rotation sensor, for a predetermined time period ("Yes" in operation 1140), the controller may lower the rib 222 to return the rib 222 to its original position, in operation 1160. According to another embodiment, the controller may lower the rib 222, and change the illumination of the light emitter 224 to its original state.

However, if a user's touch input is sensed by the touch sensors S, and rotation of the inclined section 220 is sensed by the rotation sensor, the controller may calculate a rotation value corresponding to the rotation of the inclined section 220, and move a cursor displayed on the screen of the display by the rotation value, in operation 1150.

According to the technical solution described above, since the rib can prevent a user's finger from slipping on the surface of the input device even when the surface of the input device is slippery, the user can easily rotate the input device physically.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An input device comprising:
a touch pad configured to enable a user to input a gesture by touching, and to physically rotate;
a rotation sensor configured to sense physical rotation of the touch pad; and
a processor configured to control the touch pad,
wherein the touch pad has a concave, downwardly inclined shape, and comprises a curved section in a center portion, and an inclined section around the curved section,
wherein the inclined section comprises a touch sensor configured to sense a user's touch input, and at least one rib configured to be raised or lowered according to a control signal from the processor,
wherein when a user's swipe gesture is sensed by the touch sensor, and no rotation of the touch pad is sensed by the rotation sensor, the processor outputs the control signal to raise a height of the at least one rib, and
wherein when no touch input is sensed by the touch sensor for a predetermined period of time, the controller lowers the height of the at least one rib.

2. The input device according to claim 1, wherein when rotation of the touch pad is sensed by the rotation sensor, the processor calculates a rotation value corresponding to the rotation.

3. The input device according to claim 1, further comprising a light emitter disposed outside the inclined section, and configured to emit light according to a control signal from the processor,
wherein when the user's swipe gesture is sensed by the touch sensor, and no rotation of the touch pad is sensed by the rotation sensor, the processor outputs the control signal to control the light emitter to emit light.

4. The input device according to claim 1, further comprising a light emitter disposed outside the inclined section, and configured to change illumination according to a control signal from the processor,
wherein when the user's swipe gesture is sensed by the touch sensor, and no rotation of the touch pad is sensed by the rotation sensor, the processor outputs the control signal to change illumination of the light emitter.

5. The input device according to claim 1, wherein the inclined section comprises a plurality of gradations that are embossed or engraved.

6. The input device according to claim 1, wherein the inclined section is integrated into the curved section, and physically rotatable simultaneously with the curved section.

7. The input device according to claim 1, wherein the touch pad is configured to be pressed.

8. The input device according to claim 1, wherein the center portion of the touch pad is configured to be pressed, to be tilted in four directions of a up direction, a down direction, a left direction, and a right direction or in more directions, and to receive different signals according to a pressing operation and tilting operation.

9. A vehicle comprising:
a touch pad configured to enable a user to input a gesture by touching, and to rotate physically;
a rotation sensor configured to sense physical rotation of the touch pad; and
a processor configured to control the touch pad,
wherein the touch pad has a concave, downwardly inclined shape, and comprises a curved section in the center portion, and an inclined section around the curved section,
wherein the inclined section comprises a touch sensor configured to sense a user's touch input, and at least one rib configured to be raised or lowered according to a control signal from the processor, wherein when a user's swipe gesture is sensed by the touch sensor, and no rotation of the touch pad is sensed by the rotation sensor, the processor outputs the control signal to raise a height of the at least one rib, and wherein when no touch input is sensed by the touch sensor for a predetermined period of time, the controller lowers the height of the at least one rib.

10. The vehicle according to claim 9, further comprising a display configured to display content on a screen, wherein when rotation of the touch pad is sensed by the rotation sensor, the processor calculates a rotation value corresponding to the rotation, and moves a cursor displayed on the screen according to the calculated rotation value.

11. The vehicle according to claim 9, further comprising a light emitter disposed outside the inclined section, and configured to emit light according to a control signal from the processor, wherein when the user's swipe gesture is sensed by the touch sensor, and no rotation of the touch pad is sensed by the rotation sensor, the processor outputs the control signal to control the light emitter to emit light.

12. The vehicle according to claim 9, further comprising a light emitter disposed outside the inclined section, and configured to change illumination according to a control signal from the processor, wherein when the user's swipe gesture is sensed by the touch sensor, and no rotation of the touch pad is sensed by the rotation sensor, the processor outputs the control signal to change illumination of the light emitter.

13. The vehicle according to claim 9, wherein the inclined section comprises a plurality of gradations that are embossed or engraved.

14. The vehicle according to claim 9, wherein the inclined section is integrated into the curved section, and physically rotatable simultaneously with the curved section.

15. The vehicle according to claim 9, wherein the touch pad is configured to be pressed.

16. The vehicle according to claim 9, wherein the center portion of the touch pad is configured to be pressed, to be tilted in four directions of a up direction, a down direction, a left direction, and a right direction or in more directions, and to receive different signals according to a pressing operation and tilting operation.

* * * * *